United States Patent
Strathmeyer et al.

(10) Patent No.: US 7,154,863 B2
(45) Date of Patent: *Dec. 26, 2006

(54) APPARATUS AND METHOD FOR COMPUTER TELEPHONE INTEGRATION IN PACKET SWITCHED TELEPHONE NETWORKS

(75) Inventors: Carl R. Strathmeyer, Reading, MA (US); Donald Finnie, Reading (GB)

(73) Assignee: Intel Corporation, Santa Clara, CA (US)

( * ) Notice: Subject to any disclaimer, the term of this patent is extended or adjusted under 35 U.S.C. 154(b) by 51 days.

This patent is subject to a terminal disclaimer.

(21) Appl. No.: 11/026,113

(22) Filed: Dec. 31, 2004

(65) Prior Publication Data

US 2005/0122964 A1  Jun. 9, 2005

Related U.S. Application Data

(63) Continuation of application No. 10/092,832, filed on Mar. 7, 2002, now Pat. No. 6,856,618, and a continuation-in-part of application No. 09/805,501, filed on Mar. 13, 2001, which is a continuation-in-part of application No. 09/723,747, filed on Nov. 28, 2000, now Pat. No. 6,901,068, which is a continuation-in-part of application No. 08/955,834, filed on Oct. 21, 1997, now Pat. No. 6,201,805.

(51) Int. Cl.
*H04L 12/66* (2006.01)
*H04J 3/16* (2006.01)

(52) U.S. Cl. ............ 370/260; 370/401; 370/467; 379/93.09; 709/232

(58) Field of Classification Search ......... 370/352, 370/353, 389, 392, 466, 522, 260, 401, 467; 379/93.09, 110.15, 100.15; 709/232
See application file for complete search history.

(56) References Cited

U.S. PATENT DOCUMENTS 6,876,633 B1 *  4/2005  Strathmeyer et al. ....... 370/260

OTHER PUBLICATIONS

J. Schulzrinne et al. XP-002242382 "The Session Initiated Prorocol: Internet-Centric Signaling", IEEE Communications Magazine, Oct. 2000. pp. 134-141.*

J.Eosenberg et al., Programming Internet Telephony Services, IEEE, May/Jun. 1999.*

* cited by examiner

*Primary Examiner*—Afsar Qureshi
(74) *Attorney, Agent, or Firm*—Kacvinsky LLC

(57) ABSTRACT

A computer telephony interface (CTI) applications computer interfaces to a Internet telephony system which utilizes, preferably, the session initiation protocol (SIP). In one preferred technique, an additional pass through server is added to connect end users to their associated SIP proxy server, and to connect a CTI applications computer to the system.

7 Claims, 9 Drawing Sheets

Caller
a.smith@intel.com

Callee
joe.bloggs@intel.com

INVITE sip:joe.bloggs@intel.com SIP/2.0
Via: SIP/2.0/UDP 123.123.123.1:5060
From: <sip:a.smith@intel.com>;tag=123
To: sip:joe.bloggs@intel.com
Contact: sip:a.smith@123.123.123.1
Call-ID: a62674a89a9a@123.123.123.1
Cseq: 1 INVITE
Content-Length: 156
Content-Type: application/sdp SDP data SIP/2.0 200 OK
Via: SIP/2.0/UDP 123.123.123.1:5060
From: <sip:a.smith@intel.com>;tag=456
To: sip:joe.bloggs@intel.com
Contact: sip:a.smith@123.123.123.2
Call-ID: a62674a89a9a@123.123.123.1
Cseq: 1 INVITE
Content-Length: 0

ACK sip:joe.bloggs@intel.com SIP/2.0
Via: SIP/2.0/UDP 123.123.123.1:5060
From: <sip:a.smith@intel.com>;tag=123
To: sip:joe.bloggs@intel.com;tag=456
Call-ID: a62674a89a9a@123.123.123.1
Cseq: 2 ACK
Content-Length: 0

Audio Connection

FIG. 4

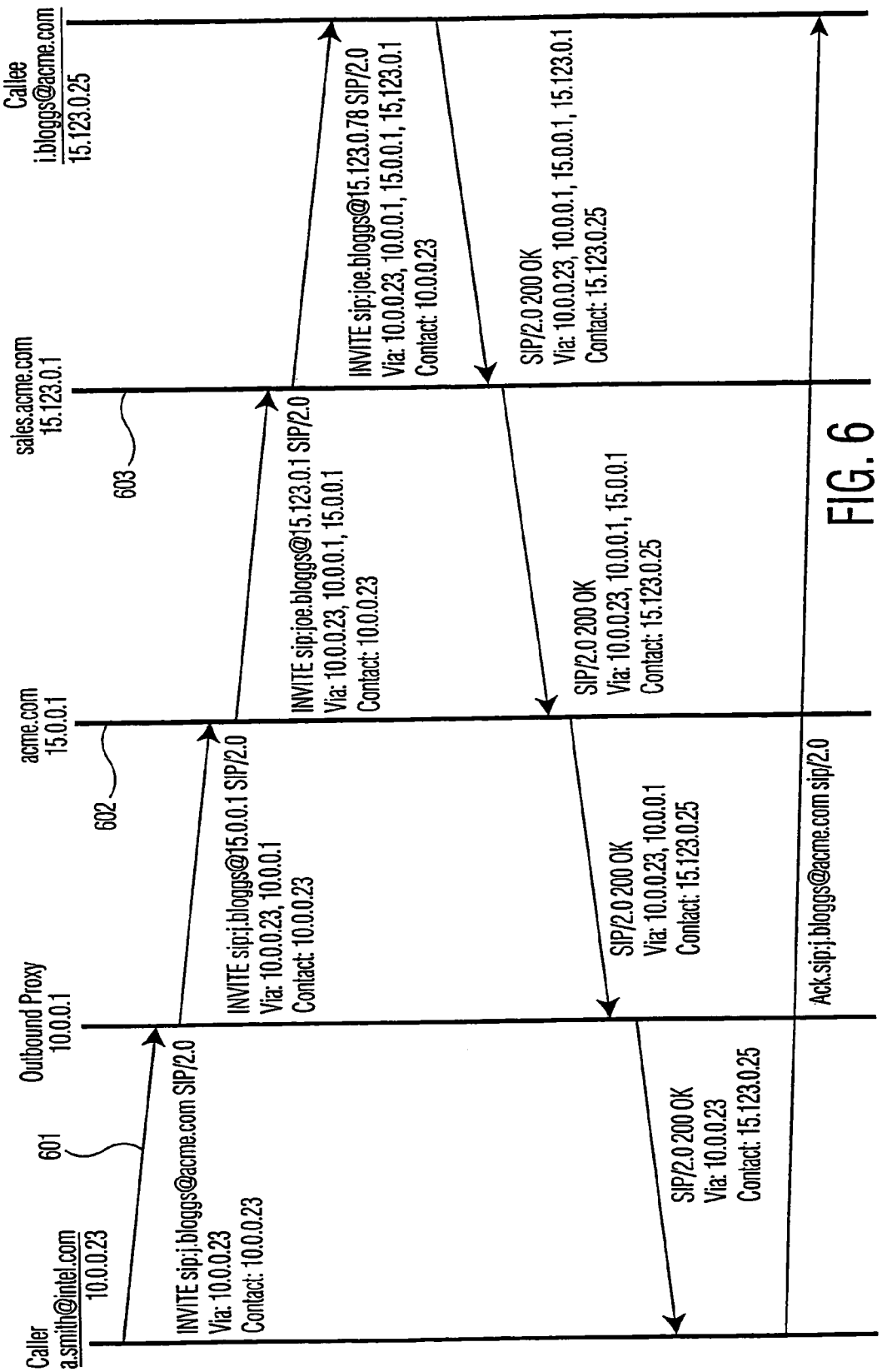

APPARATUS AND METHOD FOR COMPUTER TELEPHONE INTEGRATION IN PACKET SWITCHED TELEPHONE NETWORKS

CROSS-REFERENCE TO RELATED APPLICATIONS

This U.S. patent application is a continuation of U.S. patent application Ser. No. 10/092,832 filed Mar. 7, 2002 now U.S. Pat. No. 6,856,618, which is a continuation-in-part of each of U.S. patent application Ser. Nos. 09/723,747, filed Nov. 28, 2000 now U.S. Pat. No. 6,901,068, and Ser. No. 09/805,501, filed Mar. 13, 2001, each of which is itself a continuation-in-part of U.S. patent application Ser. No. 08/955,834, filed on Oct. 21, 1997, now issued as U.S. Pat. No. 6,201,805.

TECHNICAL FIELD

This invention relates to computer telephone integration (CTI) and, more specifically, to an improved method and apparatus for utilizing CTI techniques in a packet switched telephone network. In specific enhanced embodiments, the invention allows advanced data networking features to be utilized for telephone calls routed over the Internet, and also allows telephony functions to be implemented in conjunction with remote applications computers over a data network utilizing a variety of packet telephony protocols.

BACKGROUND OF THE INVENTION

Telephony over packet networks, particularly over wide area networks such as the Internet, has received considerable attention recently. Specifically, it is now possible to route voice, data, and video over data networks such as the Internet, and long distance telephone calls may now be routinely routed over the Internet. The transmission of such information streams over packet switched networks such as the Internet can be more cost efficient than traditional telephony, which requires a dedicated circuit between the calling and called party.

Computer telephone integration (CTI) has been widely applied to traditional telephony methods and apparatus, but has not as yet been successfully applied to the methods and apparatus used for packet network telephony.

More specifically, although it is common to control a Private Branch Exchange (PBX) or similar equipment from a remote applications computer, the use of such remote applications computers is in its early stages in the field of packet telephony.

Several protocols exist that define methods and apparatus to convey calls over packet switched data networks, such as the Internet. One possible set of methods and apparatus for completing calls over a packet switched network, which calls can handle voice and other information streams, is defined by ITU recommendation H.323. The H.323 standard is available from the International Telecommunications Unit, Geneva and is well known in the relevant industry. The H.323 standard defines various protocols dealing with call control, call setup, call termination, and other similar techniques known to those in the packet network telephony art.

The H.323 standard defines a functional entity called a gatekeeper. The gatekeeper handles network functions such as bandwidth control, zone management, address translation, and admissions control for a designated set of network terminals.

The gatekeeper function provides services analogous to the call processing function within a private branch exchange (PBX) in conventional telephony. In traditional telephony, CTI features are provided by creating an interface between external application software and the call processing function within the PBX. By contrast, in the known packet network telephony art, interfaces to the gatekeeper are only defined from other gatekeepers, end points, and other network entities.

A second protocol for performing packet telephony control functions is the Session Initiation Protocol (SIP) defined by IETF RFC 2543. Like H.323, SIP includes a plurality of functions that establish, modify and terminate multimedia sessions. The SIP methodologies include a variety of functions that go beyond those described by H.323. For example, SIP includes the ability to support mobile users, the use of standardized HTTP syntax and URLs, the ability to have multiple SIP connections through a single TCP/IP session, the use of "proxy servers" (defined further below) and a variety of other robust features discussed in more detail below.

However, SIP methodologies also lack the ability to seamlessly interface to a third party applications computer for the purpose of implementing call control, monitoring, and related functions. Additionally, SIP is utilizes a connectionless protocol, making call setup much faster.

BRIEF DESCRIPTION OF THE DRAWING

FIG. 4 shows a signal diagram of a direct connection from a calling terminal to a called terminal using the Session Initiation Protocol (SIP);

FIG. 6 shows a signal diagram using proxy servers and the SIP protocol;

DETAILED DESCRIPTION OF THE PREFERRED EMBODIMENT

A technical advance is achieved in accordance with the present invention that relates to a packet network telephony call processing device (e.g.; an H.323 gatekeeper, a SIP proxy server, and/or a "pass-through" server) that is arranged to interface with a plurality of external call processing applications programs that may be located on one or more remote computers. Regardless of the protocol utilized, we term herein as the CTI interface the server or computer and associated software that interfaces to the third party applications computer from the computer telephony environment. As explained below, in a SIP situation, this CTI interface may be, for example, the proxy server or "pass through" server, and in the H.323 environment, such CTI interface is preferably the gatekeeper.

In accordance with the teachings of the present invention, a call processing application computer is connected via a data network to a CTI interface, and these two entities exchange messages in the manner specified by the invention. The CTI interface may be locally or remotely located with respect to either of the endpoint terminals that will participate in the call, or with respect to the applications computer.

The CTI interface and applications computer(s) communicate with one another in order to perform various call control functions over the data network and to provide call information and control to a user of the applications computer. As packet switched telephone connections are set up between various terminals or other nodes, the CTI interface communicates with one or more application computers in order to provide the call information and call control functions required by the computer telephony applications residing on the application computers. Examples of these functions include establishing and tearing down calls, transferring calls, call conferencing, associating the applications computer with one or more specific locally registered endpoints for monitoring and control, determining the state of calls at a given end point, and various other functions. For purposes herein, an endpoint may be a user terminal or may be an individual port on and SIP enabled device.

In connection with the SIP protocol, additional functions such as keeping track of mobile users, performing DNS mapping, interfacing with redirect and proxy servers (defined below) and monitoring the results of calls implemented by such proxies, and plural other enhanced functions described below are implemented.

Figure 1:
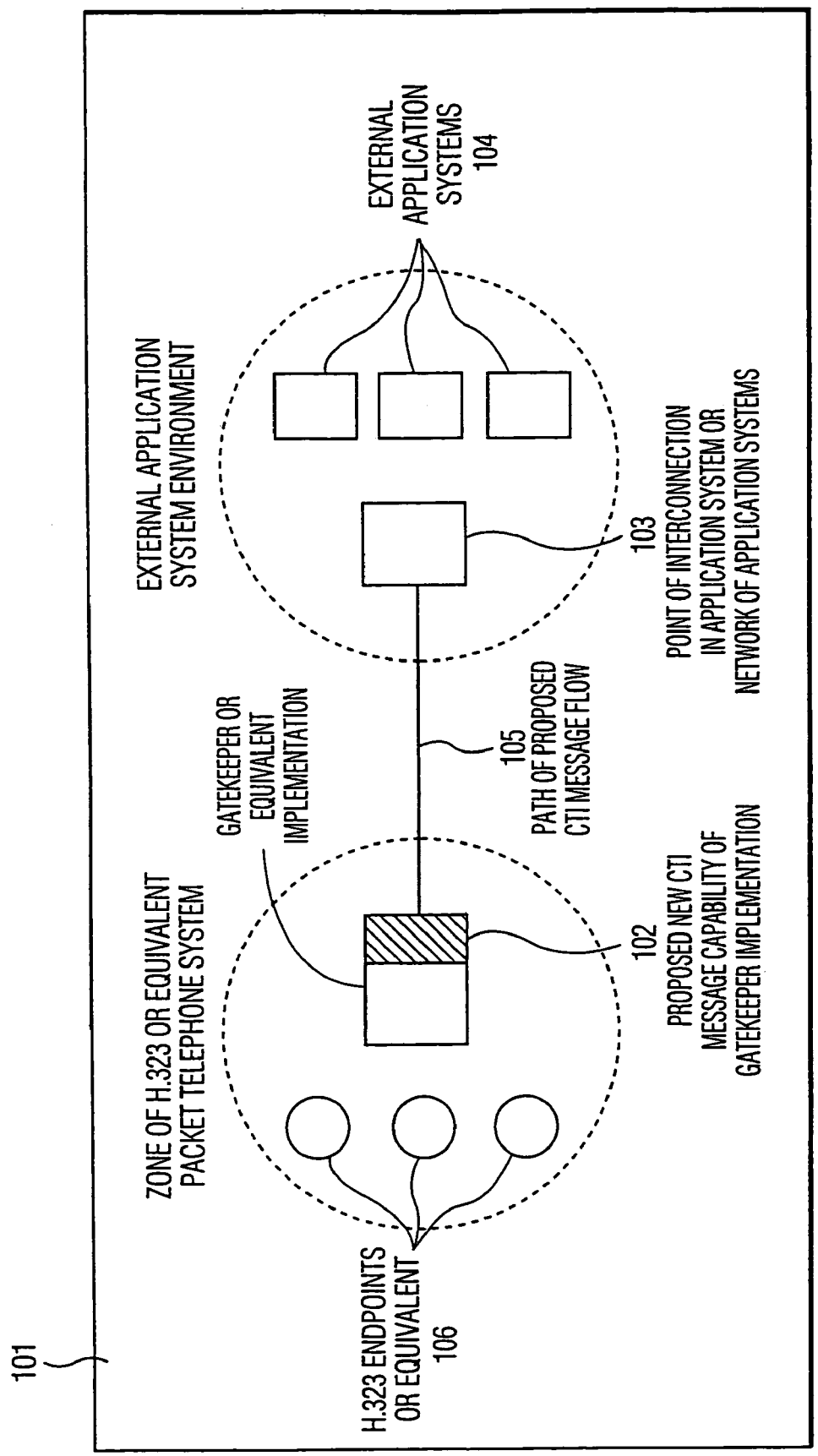
FIG. 1 shows a conceptual overview of an exemplary embodiment of the present invention as incorporated into a packet network telephony system.

FIG. 1 illustrates an overview of the interconnection of the gatekeeper computer 102 with the applications computer 103 according to the teachings of the present invention and utilizing the H.323 standards and terminology. To enable such interconnection, gatekeeper computer 102 is enhanced and extended by the addition of software whose functions are described below. Communications path 105 may be any type of data communications path.

The arrangement of FIG. 1 includes several external telephony applications systems 104, typically implemented as software, which may be located on applications computer 103 or on separate computers connected via any communications network to applications computer 103. Typically, the applications computer may be collocated with one of the end points described below.

The arrangement of FIG. 1 also includes end points 106, which may be personal computers, network computer devices (NCs), or any other node capable of interconnection to the packet network telephony environment.

In operation, a command is issued from an applications computer 103 requesting certain telephony services which will be described below. The message requesting such a service is transmitted through path 105 to gatekeeper computer 102 for processing. The message sent to gatekeeper 102 causes gatekeeper 102 to exchange appropriate signaling messages with other packet network telephony environment nodes in a manner as described for example in the incorporated H.323 standard. As a result of this sequence of events, the combined system is able to implement the call processing functionality requested by applications computer 103 on behalf of applications 104.

During operation, various call control functions requested by applications computer 103 are performed by the gatekeeper 102. Additionally, by making appropriate requests of gatekeeper 102, applications computer 103 may monitor the outcome of various call control functions and transmit such outcome to any of applications 104.

Figure 2:
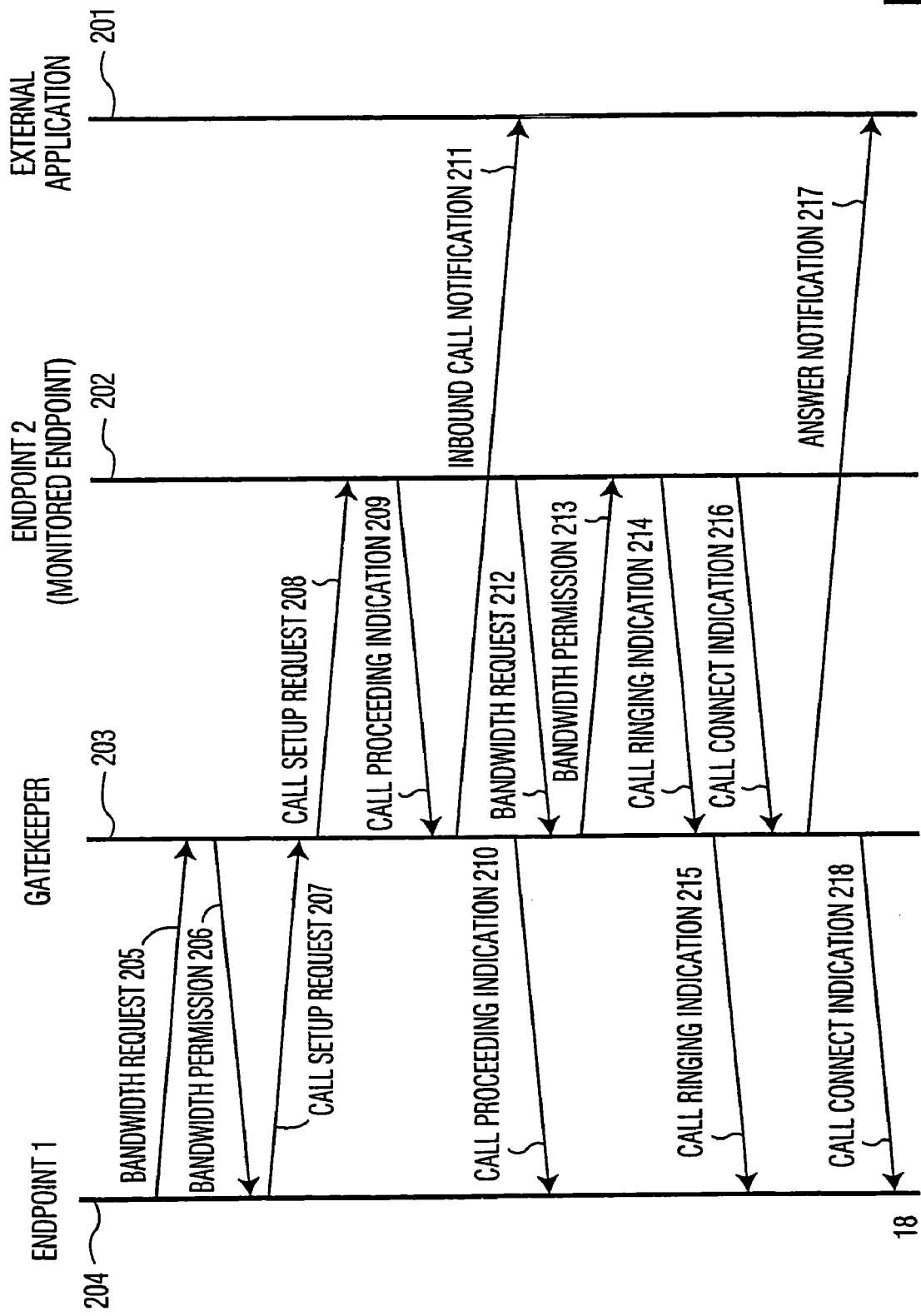
FIG. 2 shows exemplary message flow between system elements during the establishment of an inbound call that is detected by an external software application using the packet network telephony system as enhanced and extended by the present invention, and the H.323 protocol.

FIG. 2 shows an exemplary message flow diagram for detecting an inbound call from a remote end point (e.g., terminal) to a local end point supervised by an external computer telephony application using the present invention. The specific example shown in FIG. 2 is the monitoring of an incoming call to end point 202 using packet network telephony methods and apparatus as described in the H.323 standard, enhanced by the present invention to permit the participation of an external software application 201. End points 202 and 204 represent audio terminals, for example, computer systems equipped as H.323 compliant telephone devices. Gatekeeper 203 is as described, for example, in the H.323 standard and as further enhanced by the present invention, and the external application 201 may be present on a separate computer as previously discussed.

In operation, the call initially proceeds according to the methods of the packet network telephony environment. A bandwidth request message 205 is sent to gatekeeper 203 and bandwidth is granted by the gatekeeper at message 206. A call setup request, message 207, is issued by the initiating end point 204, and gatekeeper 203 causes call setup request message 208 to be transmitted to receiving end point 202. A call proceeding message 209 is transmitted by the receiving end point back to gatekeeper 203 and relayed to initiating end point 210 as shown.

At approximately the same time gatekeeper 203 relays the call proceeding indication to the initiating end point using message 210, gatekeeper 203 also transmits to external application 201 a notification that an inbound call is being received by the receiving end point 202. Gatekeeper 203 sends this message because external application 201 has previously indicated that it requires notification of telephony events occurring at receiving end point 202.

In order to connect the inbound call, receiving end point 202 requires network bandwidth, and such bandwidth is requested from and allocated by the gatekeeper 203 using messages 212 and 213. Next, the terminal at monitored end point 202 rings to alert the user to the arriving call, and an indication of such ringing is transmitted through messages 214 and 215 to initiating end point 204 through the gatekeeper 203. When the call is connected at the receiving end point 202 because of user action, end point 202 informs gatekeeper 203 via message 216.

At this point, gatekeeper 203 sends an answer notification to the external application 201 via message 217.

At approximately the same time, gatekeeper 203 indicates to the initiating end point 204 that the requested call has been connected via message 218.

In accordance with the protocol described hereinbefore, the detection of the call by an external application is accomplished via a protocol of messages transmitted between the gatekeeper and the end points to be connected, as well as between the gatekeeper 203 and the external application 201, thus enabling gatekeeper 203 to inform external application 201 regarding the progress of relevant calls in the packet telephony network.

Figure 3A:
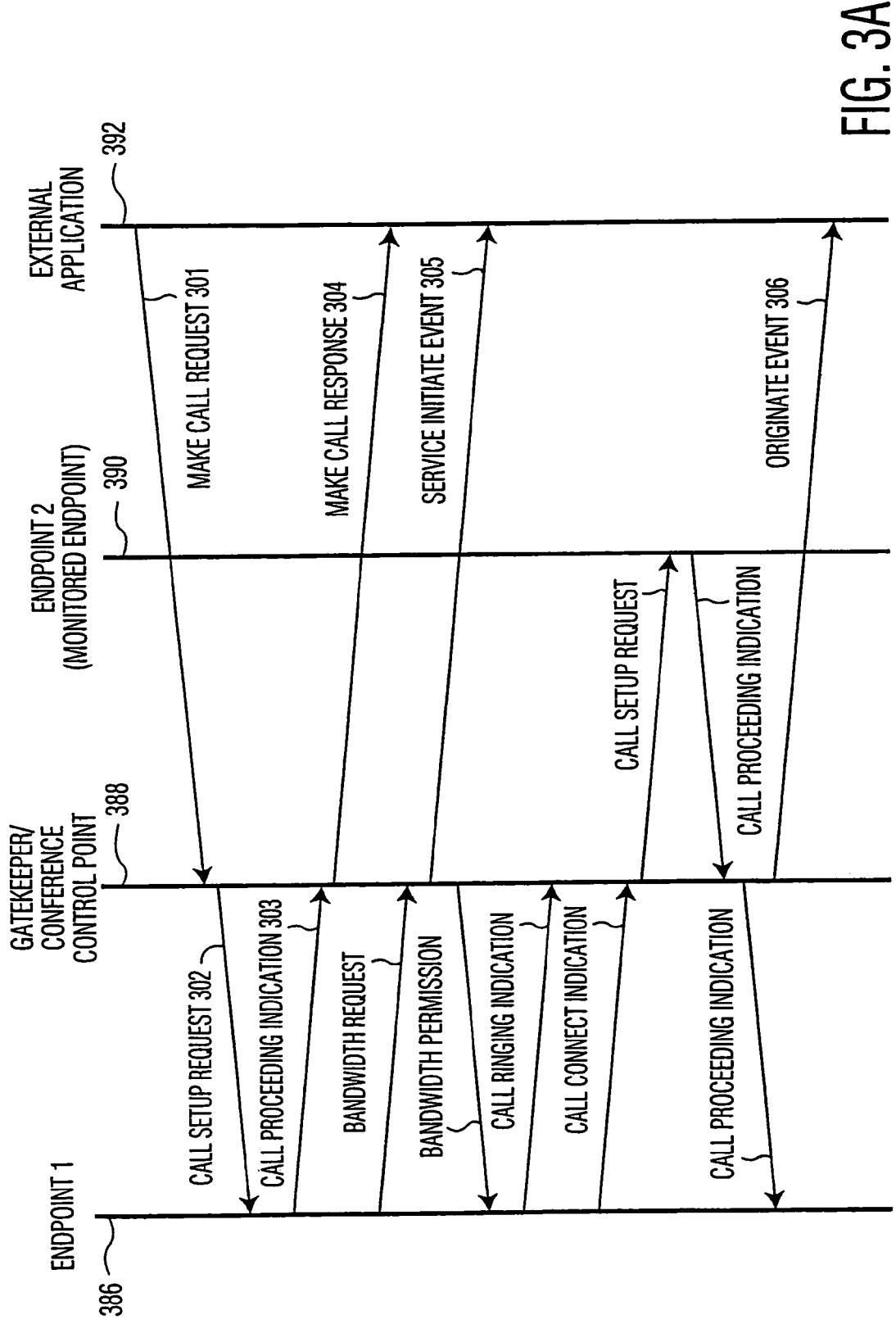
FIG. 3 shows an exemplary message flow diagram utilizing the invention to establish an outbound call requested by an external software application in a similar environment.

FIGS. 3a and b show another example of an external call processing application requesting the establishment of an outbound call from initiating end point 386 to receiving end point 390. Many of the messages involved in this operation are substantially similar to those previously set forth with respect to the monitoring of the inbound call described in FIG. 2. New messages not previously discussed in FIG. 2 are described below. As with the discussion of FIG. 2, the external application 392 in FIGS. 3a and 3b is assumed to have previously communicated with gatekeeper 388 in accordance with other methods described by this invention to indicate its intention to issue call control requests with respect to initiating end point 386.

Figure 3B:
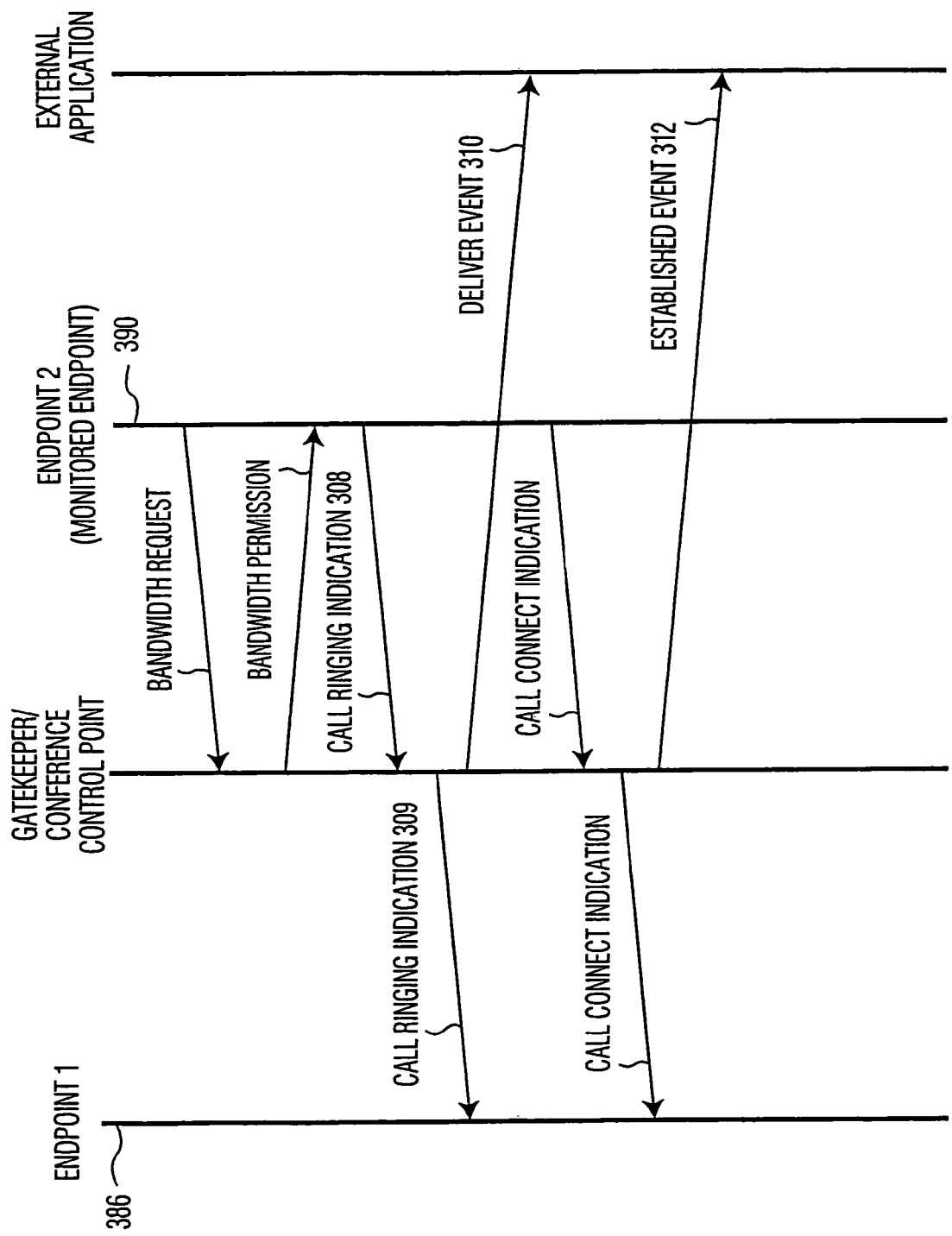

In FIGS. 3a and 3b, gatekeeper 388 also includes the conference control point function as currently known to the packet network telephony art. This function is used by the invention to interconnect two call segments, namely the segment between the initiating end point 386 and the conference control point; and between the conference control point and the receiving end point 390. For clarity of description, the combined gatekeeper and conference control point apparatus is referred to as "gatekeeper 388."

The sequence of messages begins with a new message 301, specified by the current invention, through which the external application 392 makes a request that the first segment of the call be established from gatekeeper 388 to initiating end point 386.

Next, according to known packet network telephony art, messages 302 and 303 are exchanged between gatekeeper and initiating end point 386 in order to set up that first leg of the call.

Next, the gatekeeper 388 sends a new message 304 to external application 392 to alert it that the call request has been received and is being processed. Much of the remaining signaling, relating to the establishment of that segment of the call between initiating end point 386 and gatekeeper 388 in FIGS. 3a and 3b, is substantially similar to that previously described with respect to FIG. 2 and thus will not be repeated. Similarly, once the first leg of the call has been set up, gatekeeper 388 proceeds in similar fashion to set up the second leg of the call from itself to receiving end point 390.

However, during the process depicted in FIGS. 3a and 3b, gatekeeper 388 sends new messages to the external application 392 at relevant stages of call processing, including:
1. Message 305 indicating that initiating end point 386 has acquired the necessary network bandwidth to place the call;
2. Message 306 indicating that receiving end point 390 is processing the request for the call;
3. Message 310 indicating that receiving end point 390 is alerting its user to the arriving call; and
4. Message 312 indicating that receiving end point 390 has answered the call and a connection has been established.
5. Any other messages relating to exceptions, status, or control. The application systems 104 may then provide monitoring and control as desired, and as described in the parent application, now U.S. Pat. No. 6,201,805. Thus, the system provides for monitoring and control of H.323 calls.

Figure 5A:
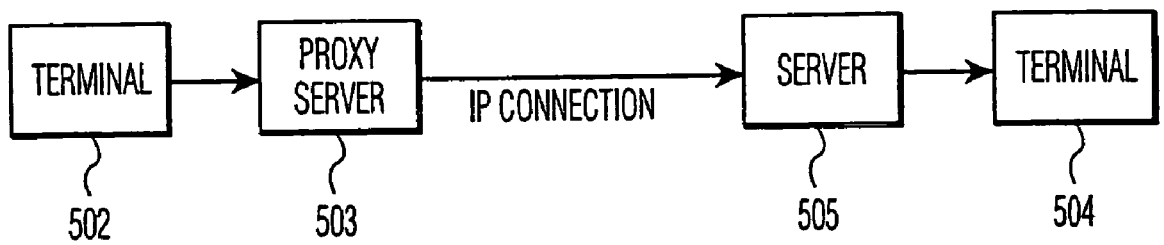
FIG. 5 shows two different embodiments of an SIP implementation in a network.
Figure 5B:
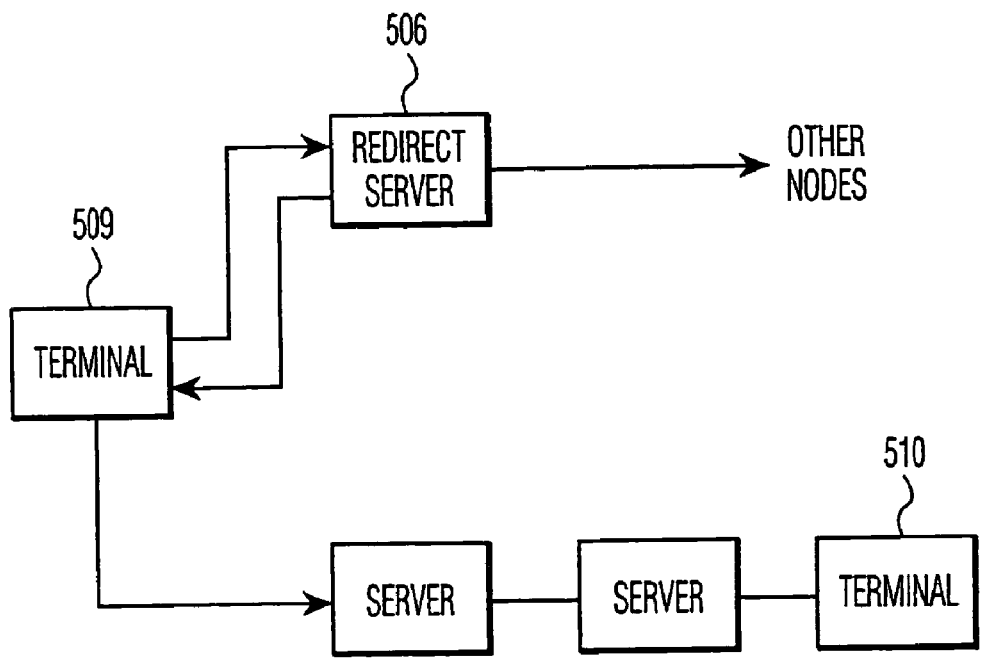

FIG. 4 shows an alternative embodiment of the present invention utilizing the Session Initiation Protocol (SIP) in place of H.323. In SIP, callers and callees can establish calls in one of three manners; (1), the caller directly contacts the callee, as shown in FIG. 4; (2), the caller contacts the callee through a proxy server, as shown in FIG. 5A; or (3) the caller contacts the callee through a re-direct server shown in FIG. 5B. As will be explained further below, the signaling sequence for the three methodologies is very similar, except that the information required to contact the callee is derived from different sources for the three different cases.

More specifically, in the direct contact of FIG. 4, the caller is aware that the SIP Universal Resource Location ("URL") of the callee maps to a specific known Internet protocol ("IP") address. In the arrangement on FIG. 5A, the caller is not aware of the IP address of the callee. Therefore, the caller 502 sends a request to the proxy server 503 to call the desired SIP URL of the called party, and proxy server 503 translates the SIP URL to the IP address of called party 504. The proxy server 503 then forwards the request over a data network to the called party 504.

Finally, the use of a re-direct server 506 allows the SIP URL to be translated by redirect server 506, but rather than transmit the request to the called user as in the case of the proxy server in FIG. 5A, the translated address is returned back to the caller 509 for a direct connection through appropriate servers to called party 510.

In the FIG. 5A example of a proxy server, the exemplary called terminal's SIP URL could be, for example, Joe@acme.com, and the proxy server would translate that address to the appropriate top-level SIP server for the acme.com domain into a more standardized Internet address, such as 33.65.43.85. The standardized address is then used to route the data through the network utilizing standardized protocols such as TCP/IP and the like.

Of the three types of SIP calls described, the least common would be that of FIG. 4. Normally the caller will not have the appropriate IP address for the called party and would require the translation services of a server. While most systems would normally operate utilizing either a proxy server 503 or redirect server 506, for purposes of explanation herein, and not by way of limitation, we utilize the example of FIG. 5A wherein a proxy server 503 is implemented.

Referring to FIG. 5A, when an SIP client 502 attempts to initiate a call, it sends an SIP Invite message to proxy server 503 specifying the SIP URL of the desired called party 504. The proxy server 503 must initiate the task of resolving this SIP URL to the IP address of called party 504. The proxy server may use the standardized domain name system to resolve such address, or any other resolution scheme desired. Additionally, at the stage in call processing where proxy server 503 receives the Invite message from caller 502, any policy management desired may be applied. For example, proxy server may read the calling terminal identification ("ID") to ensure that the caller is authorized to make the call, that the appropriate network bandwidth is available, that any reporting, or logging of information takes place, etc.

After any such initial local processing by proxy server 503, proxy server 503 translates the desired called party name into an address and forwards the resolved address with the request through one or more further servers 505 to called party 504. The sequence is shown more clearly in FIG. 6. The invite message 601 is received from the outbound proxy and forwarded through one or more servers to ultimately reach the called party terminal. The vertical line 602 represents the domain acme to which the request is forwarded, and the vertical line 603 represents the subdomain, which ultimately forwards the request to the called terminal. For example, vertical line 602 may represent the domain name acme.com, and vertical line 603 would represent the sales department, or subdomain, sales.acme.com.

In response to receiving the Invite message, the SIP OK return message is forwarded back through the same path substantially as previously described with respect to the direct connection of FIG. 4. Next, as shown, the ACK message gets sent from calling terminal 503 to the called terminal 504 again as previously described. It is noted that as the call set up messages are exchanged between the caller and called party, messages may follow the same path, or they follow different paths through different servers. SIP includes appropriate commands to force use of the same path, as discussed further below.

In accordance with the teachings of the present invention, it is desirable to insert into the arrangement of FIG. 5A a system which can utilize Computer Telephony Integration (CTI) applications to monitor and control calls by connecting into the system. Since the proxy server 503 is also likely to handle call requests attempting to call terminal 502 (ie. when the calling party in the previous example is later the called party) it appears initially that all information regarding inbound and outbound calls would traverse proxy server 503, and thus, the proxy server 503 is the appropriate place in the system to interface the applications computer previously discussed. That is, the CTI interface should be the proxy server 503, which gets connected to the applications computer. However, several issues arise:

(1) It may be undesirable to integrate all of the software for interfacing with an applications computer directly with the proxy server software that is already functional.

(2) Proxy server 503 may process the initial call set up message, but subsequent messages are likely to be communicated directly between the caller and called party through servers other than the proxy server 503. Therefore, if the applications computer is connected to the proxy server 503, proxy server 503 will only have limited view of the ongoing call, and would not even be aware, for example, of a call being disconnected.

(3) Requests for calls are typically made by a calling terminal 502. If the applications computer were responsible for the initiation of the call, the application computer terminal would originate the call through the proxy server, not one of the normal states expected by SIP.

Each of the foregoing issues must be addressed in order to integrate the CTI applications computer with the SIP system.

Figure 7:
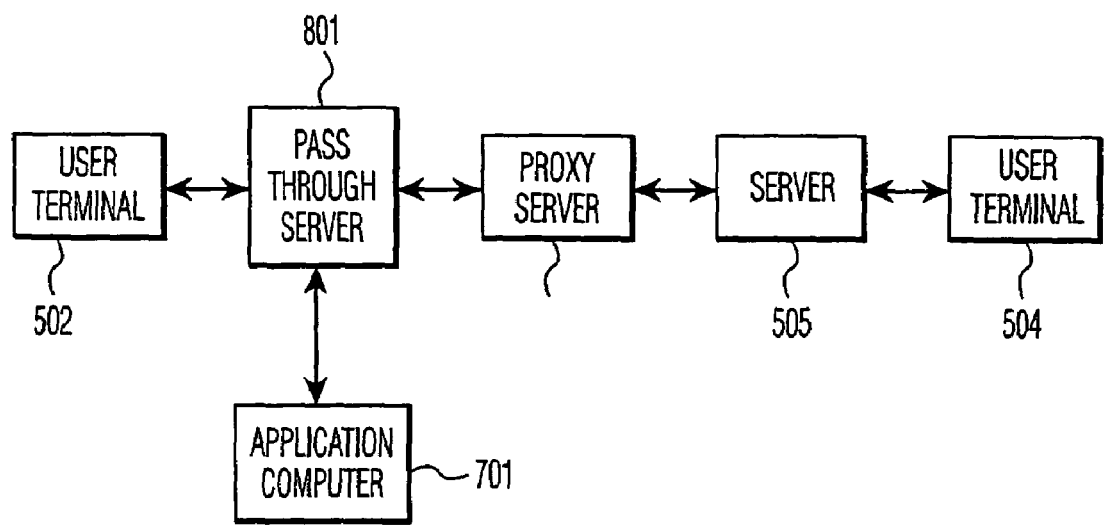
FIG. 7 depicts a computer telephony integration (CTI) applications computer interfacing with a network implementing SIP.
Figure 8:
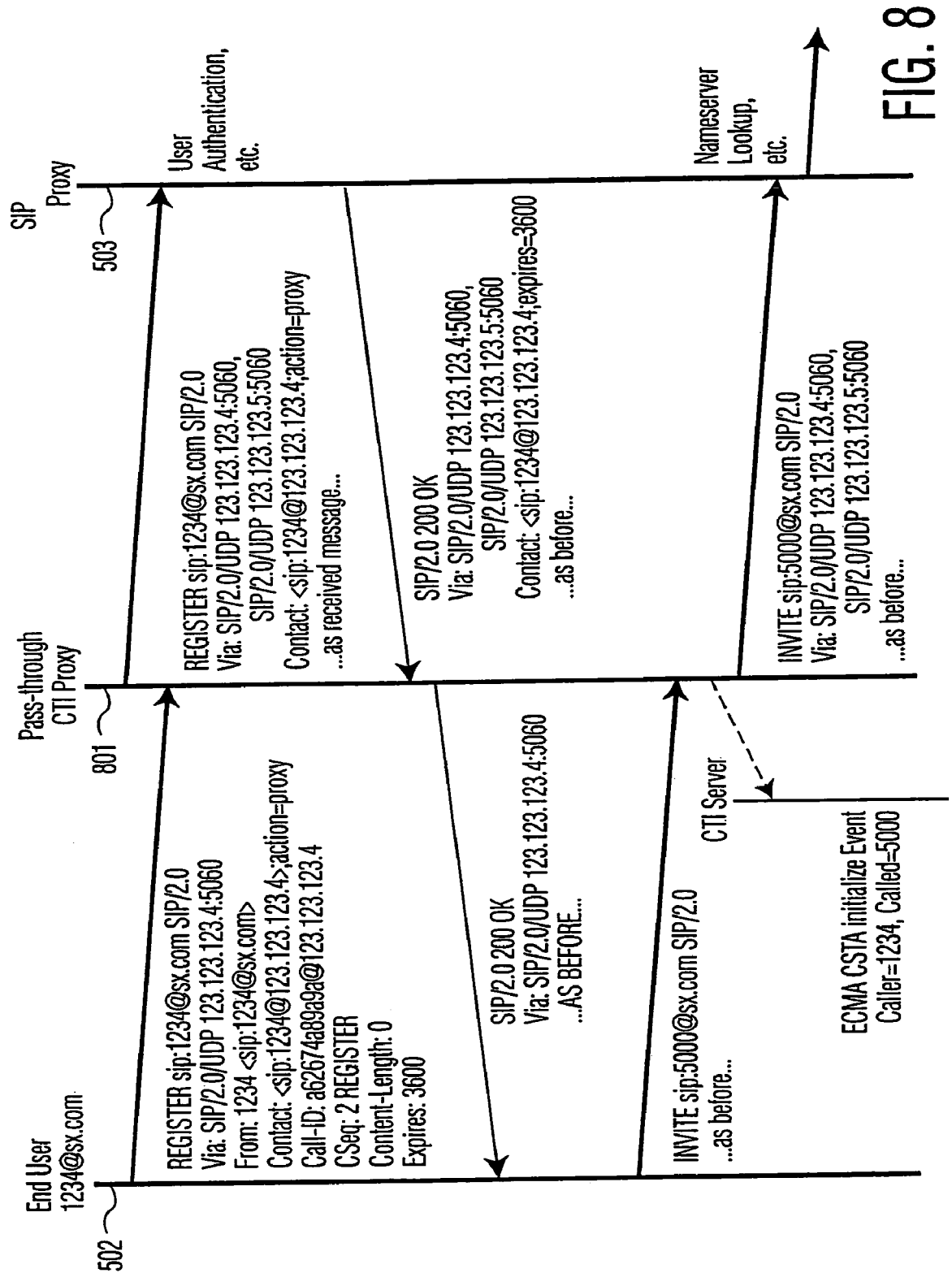
FIG. 8 shows another signal diagram for an exemplary embodiment of the invention.

One possible implementation for interfacing an applications computer with an SIP proxy is depicted logically in FIG. 8. A new entity termed a pass through proxy 801 is depicted. The pass through proxy is software which may physically run on proxy server 503 but which is interposed logically between the software, which would otherwise be resident on proxy server 503 in a SIP environment without CTI, and terminal 502. Alternatively, the pass through proxy 801 may be a separate device interposed logically and physically between proxy server 503 and terminal 502. In FIG. 7, we show an example of the latter, which we shall utilize for explanation purposes herein.

In operation, a pass through proxy 801 would typically service plural user terminals (e.g., 502) and one proxy server 503. Just as the standard SIP protocol allows plural terminals to register with it, the pass through proxy 801 provides for registration as well. When the pass through proxy 801 receives a Register request from a terminal, it records the contact details but otherwise forwards the request unchanged to the proxy server 503. This recording permits the pass through proxy to have knowledge of which terminals are associated with a particular proxy server 503 but otherwise leaves all the forwarding information unchanged. Thus, neither the terminal 502 or proxy server 503 needs substantial modification to work with the CTI interface.

Assuming a single pass through proxy 801 is associated with each proxy server, recording each Register request results in a list of terminals that constitute the entire domain for which the pass through proxy 801 would be responsible. In other words, the Register list in pass through proxy 801 mirrors that of proxy server 503 of FIG. 7. It should be noted that the pass through proxy 801 should not be a redirect server, since that would cause the proxy server 503 to not reflect the same data as that stored in the pass through proxy 801.

Similarly, when an Invite message is received, the pass through proxy adds a header to the request and then forwards it to the SIP proxy 503. The "Via" header, part of the known SIP protocol, may be used for this purpose. The additional header added upon the first message for a specific call being set up from a calling terminal 502 causes subsequent result/acknowledgement messages to be transmitted through the pass through proxy 801. Such system provides that for all outbound call set up messages, any status and control information required to be monitored by applications computer 701 will be transferred through pass through proxy 801. This provides a full view of the outbound call set up, acknowledgement and status messages at the pass through proxy 801, and thus, to the applications computer 701 that interfaces to pass through proxy 801. Moreover, such a solution does not require rewriting of normal SIP proxy software, since the pass through proxy hardware and/or software may be implemented entirely separately from the SIP proxy server.

The foregoing mechanism provides a solution for outbound call setup, control and monitoring, and tear down, but there is still an issue remaining for inbound calls. More specifically, in order for the applications computer 701 to insure access to all information regarding inbound calls, such information must pass through proxy server 503 and pass through server 801. Otherwise, as shown in FIG. 7, application computer 701 cannot monitor or control such call. The solution to this problem is similar to the previous solution. When a terminal is registered with any proxy server in the entire system, a special header is added to its address. The "maddr" header in the SIP protocol may be used for this purpose. The header affects the address translation process when other proxy servers associated with calling terminals attempt to contact the particular called terminal associated with the subject address.

More specifically, the header is used to override the host address part of the address translation process and cause any inbound call setup messages to a terminal to be routed through the proxy server 503. Since all communications between the proxy server and the subject terminal must take place through the pass through server 801, addition of this header will cause all messages concerning inbound call setup to be transmitted through the pass through server 801 as well. More simply put, the address of a terminal, when it registers, is slightly modified to cause all inbound messages to be rerouted through pass through server 801 in addition to the proxy server 503.

The previously defined solutions cause all inbound and outbound call signaling to be transmitted through the proxy server 503 and pass through proxy 801. As shown in FIG. 7, since the applications computer 701 interfaces to pass through server 801, there is now full access to all call data, and the system has not altered the proxy server 503 in any substantial way as to cause rewriting of the software or even reconfiguration of the proxy server 503.

While the above technique insures that pass through proxy 801 has access to call setup messages for inbound and outbound calls, the headers may also require that all messages concerning the call (e.g. busy signal, call hang-up, etc.) are transmitted through the pass through proxy. In general, the pass through proxy 801 and/or proxy server 503, utilizing the techniques of the present invention, add headers to insure that the functions desired to be monitored and controlled pass through the separate logical portion of the system that monitors and controls those functions. The "record-route" header may be utilized to ensure that all control messages after call setup (e.g. disconnect) are routed through the pass through proxy.

Moreover, the fact that the messages pass through the pass through proxy 801 does not necessarily mean that all such messages should be monitored and recorded. The pass through proxy 801 can be configured via software to only monitor and record messages if and when instructed to do so by the applications computer 701, such as when applications computer 701 is operable, or to only record certain events or control others upon specified triggers occurring.

The problem is solved by having the applications computer 701 indicate to the pass through server that it should signal the calling terminal 502 as if it were receiving an inbound call from the pass through server. This "fake" inbound call is intended to prepare the calling terminal 502 to enter a state where it can listen to (an as yet undefined) media stream to be set up in a subsequent outbound call to the called terminal 504, described below.

When calling terminal 502 has answered the call, it has a call set up to the pass through proxy with no media channels. On receiving the acknowledgement to this call, the pass through proxy then initiates the outbound leg of the call as usual (via the proxy server) to the intended called party 504. When the pass through proxy receives an acknowledgement for this leg of the call it can then update the calling terminal 502 with the new media channel information in another Invite message for the original call.

In response to receipt of the fake inbound call from application computer 701, calling terminal 502 will perform its normal processing on inbound calls, typically examining information associated with the calling party. The calling party information filled in by pass through server 801 is the pass through server 801 address itself. This initial message is sent to the calling terminal 502 instructs the calling terminal 502 to initiate a phone call to called terminal 504 in accordance with the techniques previously described.

It is noted that several variations of the basic process described above is also contemplated by the present invention. One or more of the terminals 502, 504 may actually be cellular or satellite terminals not connected via a hardwire connection to the network. Such terminals, which may use standardized Internet languages and syntax, are already known in the art.

Moreover, while there is an authorization process discussed herein related to checking the calling terminals authority to make calls, the authorization process may be more detailed. For example, certain terminals to be called may implement call blocking by instructing the proxy server accordingly. Selective call blocking from particular calling terminals may also be implemented.

Additionally, the SIP protocol is defined such that multiple SIP connections may exist within a single TCP/IP session. This means that effectively, multiple telephone calls can take place over the same TCP/IP connection, and that pass through server 801 may monitor one TCP/IP connection and then demultiplex out information concerning multiple calls. Each SIP session would be identified separately, as it presently is defined by the SIP specifications.

In another enhanced embodiment, the point-to-point call shown in FIG. 5 is replaced with a conference call wherein information may be shared among three or more terminals. Such Internet conferencing methods require that the servers conveying the media stream after call set up simply duplicate messages and transmit them to two or more different addresses. End users then have control over exiting or entering conferences by entering specified codes and passwords, in accordance with known techniques.

It is noted that the inventive techniques are embodied in software, and may be stored on a medium. A machine-accessible medium includes any mechanism that provides (i.e., stores and/or transmits) information in a form accessible by a machine (e.g., a computer, network device, personal digital assistant, manufacturing tool, any device with a set of one or more processors, etc.). For example, a machine-accessible medium includes recordable/non-recordable media (e.g., read only memory (ROM); random access memory (RAM); magnetic disk storage media; optical storage media; flash memory devices; etc.), as well as electrical, optical, acoustical or other form of propagated signals (e.g., carrier waves, infrared signals, digital signals, etc.); etc.

It is noted that while the above describes the preferred embodiment of the invention, various other modifications will be apparent to those of skill in the art. Different manners for interfacing the application computer to the SIP system may be utilized. Such variations are intended to be covered by the claims appended hereto.

What is claimed is:

1. A method comprising:
   transmitting a call initiation message to a proxy server or a pass through server;
   in response to receipt of said call initiation message, transmitting from said pass through server or said proxy server a fake inbound call message to a calling terminal specified in said call initiation message; and
   in response to said fake inbound call message, initiating an Internet telephone call from said calling terminal.

2. The method of claim 1 further comprising each of plural calling terminals registering with said proxy server and said pass through server.

3. The method of claim 2 wherein said initiating an Internet telephone call includes transmitting an Invite message of the Session Initiation Protocol (SIP) through a pass through server and a proxy server.

4. The method of claim 3 wherein said pass through server or said proxy server translate a called terminal address from a first form to a second form and transmit said address back to said calling terminal or to a separate server.

5. The method of claim 4 wherein said pass through server communicates with a Computer Telephony Integration (CTI) applications computer.

6. The method of claim 5 further comprising issuing instructions from said applications computer to instruct said pass through server to monitor or control a call with specified parameters.

7. The method of claim 6 further comprising issuing a disabling command to cease specified monitoring and control functions at specified times.

* * * * *

UNITED STATES PATENT AND TRADEMARK OFFICE
CERTIFICATE OF CORRECTION

PATENT NO. : 7,154,863 B2
APPLICATION NO. : 11/026113
DATED : December 26, 2006
INVENTOR(S) : Strathmeyer et al.

It is certified that error appears in the above-identified patent and that said Letters Patent is hereby corrected as shown below:

On the title page, in field (56), under "Other Publications", in column 2, line 1, delete "Prorocol:" and insert -- Protocol: --, therefor.

On the title page, in field (56), under "Other Publications", in column 2, line 4, delete "et al.," and insert -- et al., --, therefor.

On the title page, in field (56), under "Other Publications", in column 2, line 4, delete "Services," and insert -- Services," --, therefor.

Signed and Sealed this

Twentieth Day of February, 2007

JON W. DUDAS
*Director of the United States Patent and Trademark Office*